US011677077B2

(12) United States Patent
Talebiesfandarani et al.

(10) Patent No.: US 11,677,077 B2
(45) Date of Patent: Jun. 13, 2023

(54) SYNTHESIS OF OLIVINE LITHIUM METAL PHOSPHATE CATHODE MATERIALS

(71) Applicant: Nano One Materials Corp., Burnaby (CA)

(72) Inventors: Majid Talebiesfandarani, Burnaby (CA); Sean Mehta, Burnaby (CA)

(73) Assignee: Nano One Materials Corp., Burnaby (CA)

( * ) Notice: Subject to any disclaimer, the term of this patent is extended or adjusted under 35 U.S.C. 154(b) by 361 days.

(21) Appl. No.: 16/630,530

(22) PCT Filed: Jul. 18, 2018

(86) PCT No.: PCT/CA2018/050868
§ 371 (c)(1),
(2) Date: Jan. 13, 2020

(87) PCT Pub. No.: WO2019/014763
PCT Pub. Date: Jan. 24, 2019

(65) Prior Publication Data

US 2020/0168909 A1 May 28, 2020

Related U.S. Application Data

(60) Provisional application No. 62/534,236, filed on Jul. 19, 2017.

(51) Int. Cl.

*H01M 4/58* (2010.01)
*H01M 10/058* (2010.01)
*H01M 10/0525* (2010.01)
*C01B 25/45* (2006.01)
*H01M 4/02* (2006.01)

(52) U.S. Cl.

CPC ........... *H01M 4/5825* (2013.01); *C01B 25/45* (2013.01); *H01M 10/058* (2013.01); *H01M 10/0525* (2013.01); *C01P 2002/72* (2013.01); *C01P 2006/40* (2013.01); *H01M 2004/028* (2013.01)

(58) Field of Classification Search

CPC ........... H01M 10/052; H01M 10/0525; H01M 10/058; H01M 2004/028; H01M 4/366; H01M 4/5825; H01M 4/625

See application file for complete search history.

(56) References Cited

U.S. PATENT DOCUMENTS 6,528,033 B1 3/2003 Barker et al.
8,722,004 B2 5/2014 Wu et al.
9,413,006 B2 8/2016 Kay
2004/0151649 A1* 8/2004 Hemmer ............. H01M 4/5825 423/306
2006/0263286 A1 11/2006 Wu et al.
2007/0059598 A1* 3/2007 Yang ..................... H01M 4/485 252/182.1
2008/0008938 A1 1/2008 Wu et al.
2008/0014507 A1* 1/2008 Kejha ................... H01M 4/131 429/322
2010/0102270 A1* 4/2010 Jia ......................... H01M 4/136 252/182.1
2010/0183924 A1* 7/2010 Song ....................... C01B 25/45 252/182.1
2012/0032119 A1* 2/2012 Tahara ................ H01M 4/5825 423/306
2012/0301780 A1 11/2012 Kitagawa et al.
2014/0012714 A1 1/2014 Feldman et al.
2014/0147586 A1* 5/2014 Liang .................. H01M 4/5825 252/182.1
2017/0158509 A1 6/2017 Kang et al.
2017/0271657 A1 9/2017 Sirén et al.

FOREIGN PATENT DOCUMENTS

CN 101941687 1/2011
CN 10224921 A 11/2011
CN 102074690 1/2013
CN 102244263 9/2013
CN 102437334 10/2013

(Continued)

OTHER PUBLICATIONS

Jugovic et al. "A review of recent developments in the synthesis procedures of lithium phosphate powders", J. of Power Sources, 190, (2009), 538-544.
Satyavani et al. "Methods of synthesis and performance improvement of lithium iron phosphate for high rate L:i-ion batteries: a review", Eng Sci. and Tech, 19, (2016), 178-188.
ISA/CA; International Search Report prepared for PCT/CA2018/050868; dated Oct. 9, 2018.
Takira Kozawa et al; One-Step mechanical synthesis of LiFePO4/C composite granule under ambient atmosphere; Jul. 15, 2014.

(Continued)

*Primary Examiner* — Carlos Barcena
(74) *Attorney, Agent, or Firm* — Joseph T. Guy; Patent Filing Specialist Inc.

(57) ABSTRACT

An improved process for forming a lithium metal phosphate cathode material, a precursor to the cathode material and a battery comprising the cathode material is described. The process comprising:

forming an first aqueous solution comprising a first molar concentration of Li+and a second molar concentration of $PO_4^{3-}$;

forming a second aqueous solution comprising organic acid or a salt of an organic acid and a metal selected from the group consisting of Fe, Ni, Mn and Co wherein said metal is present in a third molar concentration;

allowing a precipitate to form;

drying the precipitate; and calcining the precipitate thereby forming the lithium metal phosphate cathode material having a formula represented by $LiMPO_4/C$ wherein the lithium metal phosphate cathode material comprises up to 3 wt % carbon.

76 Claims, 4 Drawing Sheets

(56) References Cited

FOREIGN PATENT DOCUMENTS

| | | |
|---|---|---|
| IN | 00405DE2012 | 6/2015 |
| KR | 2012 0022461 A | 3/2012 |
| WO | WO 2009003093 | 12/2008 |

OTHER PUBLICATIONS

Whittingham et al; Some transition metal (oxy)phosphates and vanadium oxides for lithium batteries; 2005.

Eftekhari et al.; LiFePO4/C nanocomposites for Lithium-ion batteries; 2017.

Hsu et al.; Synthesis and characterization of nano-sized LiFePO4 cathode materials prepared by a citric acid-based sol-gel-route; Jul. 1, 2004.

Higuchi et al.; Preparation of LiFePO4 as a cathode material for lithium ion batteries; Sep. 5, 2006.

* cited by examiner

SYNTHESIS OF OLIVINE LITHIUM METAL PHOSPHATE CATHODE MATERIALS

CROSS-REFERENCE TO RELATED APPLICATIONS

The present invention claims priority to pending U.S. Provisional Patent Application No. 62/534,236 filed Jul. 19, 2017.

FIELD OF THE INVENTION

The present invention is related to olivine lithium metal phosphate $LiMPO_4$ (LMP) cathode material wherein M represents Fe, Mn, Ni or Co and combinations thereof. The present invention is also related to improved methods for the synthesis of LMP. More specifically, the present invention is related to the synthesis of a particularly preferred LMP, which is $LiFePO_4$ (LFP), cathode material from low cost materials and with less processing than conventional solid-state or hydrothermal methods. Even more preferably the present invention is related to the improved synthesis of LMP, and particularly, LFP, comprising carbon preferably as a coating.

BACKGROUND

LMP, and more specifically LFP, is a widely used cathode material for lithium ion batteries. LFP is synthesized commercially by either a solid-state process or a hydrothermal process both of which require multiple time-consuming steps or costly precursors. Both the solid-state process and the hydrothermal process are known to form undesirable impurities. The final cathode material is typically coated with a carbon source to increase electrical conductivity thereby forming material referred to in the art as $LiFePO_4/C$ which represents carbon coated lithium iron phosphate with the understanding that the stoichiometry of the carbon is not represented in the shorthand notation $LiFePO_4/C$ or LFP/C. For the purposes of this disclosure the notation LMP/C is analogous notation referring to $LiMPO_4/C$ which is a carbon coated lithium metal phosphate.

The solid-state process requires a homogenous mixture with uniform particle distribution. Uniform particle distribution is difficult to achieve on a manufacturing scale. Mechanically mixing and grinding a large volume of solids at high temperature is a difficult process to control in an industrial environment resulting in the formation of undesirable impurities.

The hydrothermal method requires excess LiOH and produces $Li_2SO_4$ waste as a by-product. Lithium hydroxide is a relatively expensive source of lithium and $Li_2SO_4$ is an undesirable by-product which requires recycling. The necessity for recycling $Li_2SO_4$ complicates the overall manufacturing process and increases cost. The hydrothermal method also requires the use of a high pressure autoclave reactor at high temperature which is a costly process at high volumes.

Even with the difficulty associated with the synthesis, LFP is still widely accepted across the globe as a preferred cathode material for batteries. Growth in lithium ion batteries, particularly with a LFP cathode, is expected to grow. Due to the continued awareness of the environmental impact for manufacturing processes, and the cost and difficulty associated with the synthesis of LFP, those of skill in the art have had a long standing desire for a synthetic method which can use lower cost feedstocks and require less processing. An improved synthetic process is provided herein.

SUMMARY OF THE INVENTION

The present invention is related to cathode materials comprising lithium metal phosphate comprising carbon preferably as a coating, and particularly cathode materials comprising lithium iron phosphate comprising carbon preferably as a coating. The present invention is also related to an improved process for the manufacture of cathode materials comprising lithium metal phosphate comprising carbon preferably as a coating and more particularly comprising lithium iron phosphate comprising carbon preferably as a coating.

More specifically, the present invention is related to a process for the synthesis of lithium iron phosphate/carbon (LFP/C) materials using lower cost feedstock, or starting materials, and a simplified method with minimal processing.

A particular feature of the invention is the ability to manufacture $LiFePO_4/C$ in aqueous solution at relatively low temperature and ambient pressure.

These and other embodiments, as will be realized, are provided in a process for forming a lithium metal phosphate cathode material comprising: forming an first aqueous solution comprising a first molar concentration of $Li^+$ and a second molar concentration of $PO_4^{3-}$;

forming a second aqueous solution comprising organic acid or a salt of an organic acid and a metal selected from the group consisting of Fe, Ni, Mn and Co wherein the metal is present in a third molar concentration;

allowing a precipitate to form;

drying the precipitate; and calcining the precipitate thereby forming the lithium metal phosphate cathode material having a formula represented by $LiMPO_4/C$ wherein the lithium metal phosphate cathode material comprises up to 3 wt % carbon.

Yet another embodiment is provided in a process for forming a lithium metal phosphate cathode precursor material comprising:

forming an first aqueous solution comprising a first molar concentration of $Li^+$ and a second molar concentration of $PO_4^{3-}$;

forming a second aqueous solution comprising organic acid or a salt of an organic acid and a metal wherein the metal is selected from the group consisting of Fe, Ni, Mn and Co and the metal is present in a third molar concentration;

allowing a precipitate to form; and drying the precipitate.

Yet another embodiment is provided in a process for forming battery comprising:

forming a lithium metal phosphate cathode material comprising:

forming an first aqueous solution comprising a first molar concentration of $Li^+$ and a second molar concentration of $PO_4^{3-}$;

forming a second aqueous solution comprising organic acid or a salt of an organic acid and a metal wherein the metal is selected from the group consisting of Fe, Ni, Mn and Co and the metal is present in a third molar concentration;

allowing a precipitate to form;

drying the precipitate; and calcining the precipitate thereby forming the lithium metal phosphate cathode material having a formula represented by $LiMPO_4/C$ wherein the lithium metal phosphate cathode material comprises up to 3 wt % carbon; and combining the lithium metal phosphate cathode material with an anode, separator and dielectric in a battery.

DESCRIPTION

Figure 1:
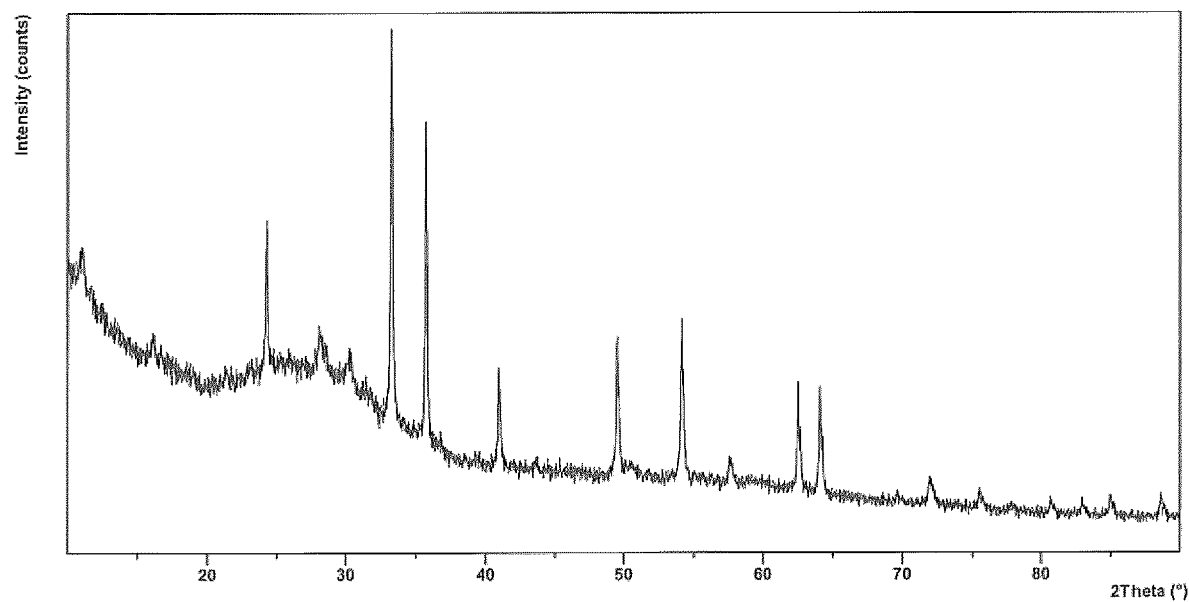
FIG. 1 is a powder XRD pattern of precursor material after drying.

The present invention is related to an improved synthesis of LMP/C, and more specifically $LiFePO_4/C$, utilizing lower cost feedstock and minimal processing. More specifically, the present invention is related to a process for forming $LiFePO_4/C$ using $Li_2CO_3$ as the lithium source and ferric oxide ($Fe_2O_3$) as the iron source both of which are available commercially at a lower cost when compared to LiOH and iron sulfate. Furthermore, there is no difficult to handle byproduct generated requiring recycling or disposal.

This method for synthesizing $LiFePO_4$ utilizes a nominally stoichiometric amount of $Li_2CO_3$ and $Fe_2O_3$ and can be performed at low temperature, such as 40° C., in aqueous solution. These advantages are significant as they require no waste treatment of $Li_2SO_4$. Since the process can be utilized at near ambient temperature and pressure, no specialized equipment is required thereby providing a significant advantage when compared to the hydrothermal method. In addition, since the reaction is performed in aqueous solution, the LFP particle size can be controlled with improved uniformity of particle size. Due to low electrical conductivity of LFP material, a source of carbon can also be added in-situ, further simplifying the overall process to form $LiFePO_4/C$ directly.

The method of synthesis includes the following steps. A stoichiometric amount of $Li_2CO_3$, preferably up to about 5% excess by mole, is added to the, preferably deionized, water to produce a carbonate suspension. A phosphate salt is added to deionized water separately from the $Li_2CO_3$ suspension. The phosphate salt is preferably selected from the group consisting of $(NH_4)_3PO_4$, $(NH_4)_2HPO_4$, $NH_4H_2PO_4$ and $H_3PO_4$ with $NH_4H_2PO_4$ being preferred in some embodiments, however, $H_3PO_4$ is preferred if it is desirable to minimize ammonia as a product of calcining. The iron source in the form of $Fe_2O_3$ is added to the solution comprising phosphate while mixing.

A carbon source, such as a mixture of citric and oxalic acid, is added to the $H_3PO_4/Fe_2O_3$ suspension upon continued mixing, preferably for at least 2 hours. The $Li_2CO_3$ suspension is added dropwise and mixed for 1-24 hours preferably at about 40° C. The carbon source, preferably in the form of a carbohydrate, functions as a reducing agent to prevent oxidation of Fe(II) to Fe(III) and acts as a carbon source to increase conductivity of the final $LiFePO_4$ material. Organic acids are preferred with citric acid monohydrate ($C_6HeO_7$—$H_2O$) and oxalic acid dihydrate ($H_2C_2O_4$-$2H_2O$) being particularly preferred. Anhydrous acids can also be used in place of hydrated acids if desired.

$FeC_2O_4$ can be used instead of $Fe_2O_3$ but it is not preferred. With $FeC_2O_4$ as the iron source a $Li_3PO_4$ impurity phase is observed after calcining if the reaction time is below about 5 hours. A reaction time of up to 48 hours can be employed, however, there is no advantage provided by allowing the reaction to proceed beyond about 24 hours. If $Fe_2O_3$ is used, a shorter time can be employed.

The pH of the solution is low during reaction and control is not necessary. The pH is typically about 1.0 to about 1.7.

After the reaction of the iron salt, phosphate salt and organic acid is complete the reaction solution is then dried to form a dried powder referred to herein as a precursor. Thin film drying is preferred.

The precursor can optionally be ball milled for a short period of time, such as less than 4 hours, to produce a more uniform and higher tap density powder if desired. Ball milling can be done with alumina, however, when alumina is used the material may be contaminated with small amounts of material from the ball media and jar. Zirconia is a particularly preferred ball media for ball milling.

The precursor is fired to obtain the LMP/C, and preferably $LiFePO_4/C$. A calcining temperature of 620-740° C. under inert gas is preferred. Above about 740° C. $Fe_3P$ impurity can be observed. Firing, or calcining, of the powder at about 660-700° C., preferably for 1-10 hours and preferably under $N_{2(g)}$ is exemplary for demonstrating the invention. Below about 1 hour calcining is incomplete. Beyond about 10 hours the oxide begins to degrade. A calcining time of about 4 hours to about 10 hours is preferable.

Decomposition products are not necessarily monitored since the primary decomposition products are gases at calcining temperature. Expected decomposition products include $NH_3$, $CO_2$, CO and $H_2O$.

The process is described herein for the formation of lithium iron phosphate for convenience with the understanding that iron can be replaced on an equal molar basis with nickel salt, manganese salt, cobalt salt, or combinations thereof to achieve, by the same process, an olivine lithium metal phosphate, referred to herein as LMP having the formula:

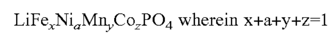

$$LiFe_xNi_aMn_yCo_zPO_4 \text{ wherein } x+a+y+z=1$$

wherein:

$0\le x\le 1$ more preferably $0.5\le x\le 1$ and most preferably $0.9\le x\le 1$;

$0\le y\le 1$ more preferably $0\le y\le 0.5$;

$0\le z\le 1$ more preferably $0\le z\le 0.5$; and $0\le a\le 0.1$.

Ferric oxide ($Fe_2O_3$), wherein iron is $Fe^{+3}$, is a preferred iron source for the reaction. Ferric oxide is typically widely available at a lower cost, per mole of iron, than iron oxalate or iron sulfate. In ferric oxide the iron is in the Fe(III) oxidation state thereby minimizing the necessity for inert air purge during the synthesis and the Fe(III) is less sensitive to pH. A particular feature of using ferric oxide is the lower volume of water required for the synthesis. Synthesizing the oxide precursor with ferric oxide requires only about 33 vol % of water relative to a synthesis using iron oxalate, for example. The use of less water decreases the drying demand thereby allowing for evaporative drying or thin-film drying at much larger scales than available with higher water content on a commercial scale.

Acid salts of nickel, manganese and cobalt, wherein the metal is in the +2 oxidation state is a preferred source of metal if nickel, manganese and/or cobalt are included. Oxalate salts of manganese, nickel and/or cobalt are mentioned as exemplary.

Post calcination milling is typically not required when ferric oxide is used.

Carbon, preferably as a coating, is desirable to obtain good electrochemical performance such as electrical conductivity, tap density, lithium ion diffusion, optimum particle size and phase purity. Carbon content also controls crystal growth of the LMP during calcination with particle size being inversely correlated to carbon content. The tap density is also inversely correlated to carbon content. Furthermore, at high carbon content impurities appear due to the reduction of iron. If the carbon content is insufficient impurities are formed due to the oxidation of iron. A final carbon content of at least 1 wt % to no more than 3 wt % is preferred to achieve optimum conductivity with sufficient tap density and particle size. Most preferably the carbon content is at least 1.5 wt % to no more than 2.5 wt % with about 2 wt % being optimal. Above about 2 wt % carbon content the electrical conductivity is not appreciably improved and as the carbon coating thickness increases the lithium ion diffusion rate can be compromised. For these reasons, and to maximize tap density, it is preferable to limit carbon content to no more than approximately 2 wt %.

Particle sizes achieved by the synthesis are typically about 200 to 400 nm in diameter with a sufficiently uniform particle size distribution.

Particularly preferred carbon sources are organic acids, particularly carboxylic acids, and more particularly di-carboxylic acids or tri-carboxylic acids. Di- and tri-carboxylic acids with less than about 10, preferably alkyl, carbon atoms are most preferred. Particularly preferred acids are selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, isocitric acid, aconitic acid, propane-1, 2,3-tricarboxylic acid and sucrose. Citric acid and oxalic acid are preferred due to their low cost and wide spread availability.

The method of drying is not particularly limited. Particularly preferred for manufacturing efficiency are thin-film drying and evaporative drying both of which provide a final product with a electrochemical performance which does not appear to be appreciably altered by the drying process. Evaporative drying is advantageous however, due to the varying solubility of reaction components, it is preferable to mix the precursor solution during drying.

The reaction of the iron salt and phosphate salt can be done in inert gas to prevent oxidation of Fe(II). For the purposes of the instant invention an inert gas is defined as a gas which will not oxide Fe(II). Suitable gases include, without limit, include $N_2$ and noble gases. $N_2$ is particularly preferred due to the relatively low cost and wide spread availability.

Throughout the description a stoichiometric amount refers to the addition of a reactant in an amount sufficient to form the resulting product in the proper stoichiometry within experimental error. A stoichiometric amount, as defined herein, is at least within 5 mole % of the theoretical stoichiometric equivalent desired and preferably within 1 mole % of the theoretical stoichiometric amount desired. By way of example a stoichiometric equivalent of lithium and phosphate would preferably have a molar ratio of lithium to phosphate from 0.95:1 to 1.05:1 and preferably from 0.99:1 to 1.01:1.

The process is easily scalable for large scale manufacturing using presently available equipment and/or innovations of the present industrial equipment. The inventive cathode is incorporated into a battery wherein the battery comprises an anode, which is not limited herein, a separator, which is not limited herein, and a dielectric, which is not limited herein. The formation of a battery from an inventive cathode as described herein, an anode, a separator and a dielectric is well known to those of skill in the art and further elaboration is not necessary herein.

EXAMPLES

Solution 1 was prepared by adding 230.5 grams of $H_3PO_4$ to 0.7 L of deionized water and the solution was mixed for 20 minutes. 159.7 grams of $Fe_2O_3$, 126.0 grams of oxalic acid and 52.5 grams of citric acid were added to the solution and the solution was stirred for 1-2 hr. The solution had a pH of about 1.3-1.5.

Solution 2 was prepared by adding 77.6 grams of $Li_2CO_3$ to 0.8 mL of deionized water in a separated beaker and the solution was mixed for about 20 minutes.

Solution 2 was added drop wise to the Solution 1 over a period of about 1 hr. It is preferable to add the lithium carbonate containing solution slowly to avoid foaming due to evolution of $CO_2$. The combined solutions were mixed aggressively at 40° C. for up to 24 hours preferably while covered to avoid evaporation of water resulting in a reaction solution.

The reaction solution was dried by thin film drying at a temperature of about 200° C. X-ray diffraction (XRD) of the dried powder indicated the presence of $Fe_2O_3$ and other lithium compounds, of the general formula $Li_xC_yO_z$, which are all converted during calcination to the final $LiFePO_4$/C. The powder was then fired at about 670° C. for about 4 hours under $N_{2(g)}$ in a tube furnace resulting in $LiFePO_4$/C.

While not limited by theory, the $H_2C_2O_4$ is hypothesized to act as a reducing agent and a dispersing agent of $Fe_2O_3$ and $Li_2CO_3$ in water. The particle size, morphology, and surface area of the final $LiFePO_4$/C material can be controlled by altering the synthesis conditions such as time, temperature and duration time.

FIG. 1 shows the XRD pattern of evaporative precursor material prior to calcination. The main diffraction peaks index as iron oxide ($Fe_2O_3$) and other lithium compounds which are all converted during calcination to the final $LiFePO_4$/C cathode material.

Figure 2:
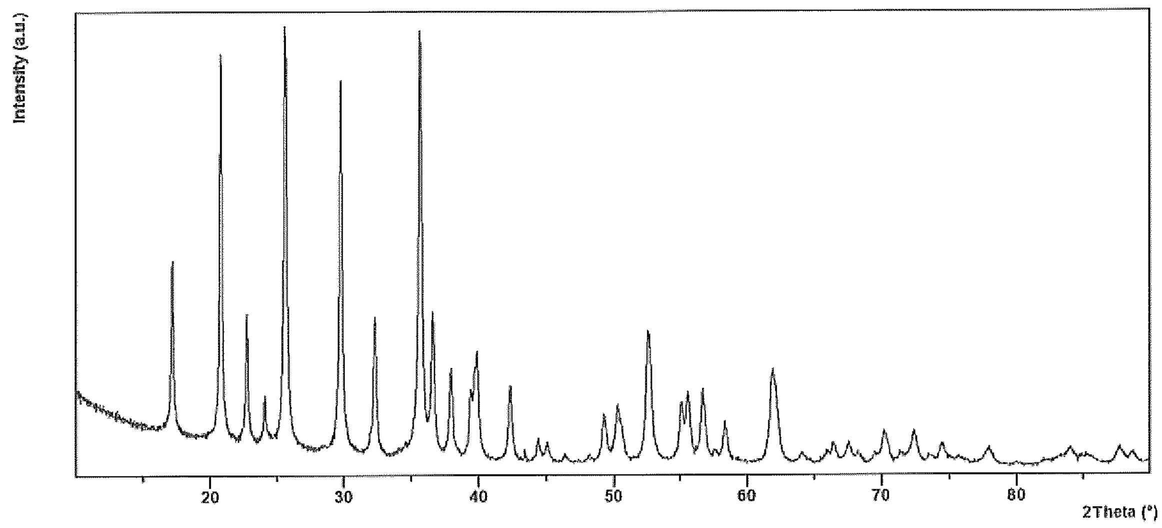
FIG. 2 is a powder XRD pattern of calcined inventive $LiFePO_4/C$ cathode material.

FIG. 2 shows the powder XRD pattern of the $LiFePO_4$/C material. All the main peaks index to an orthorhombic olivine structure indicating a standard $LiFePO_4$ phase. Observable peaks related to detrimental impurity phases common in traditional hydrothermal or solid state methods, such as $Li_4P_2O_7$, $Fe_2P$, $Fe_2P_2O_7$ etc., were not detected.

Figure 3:
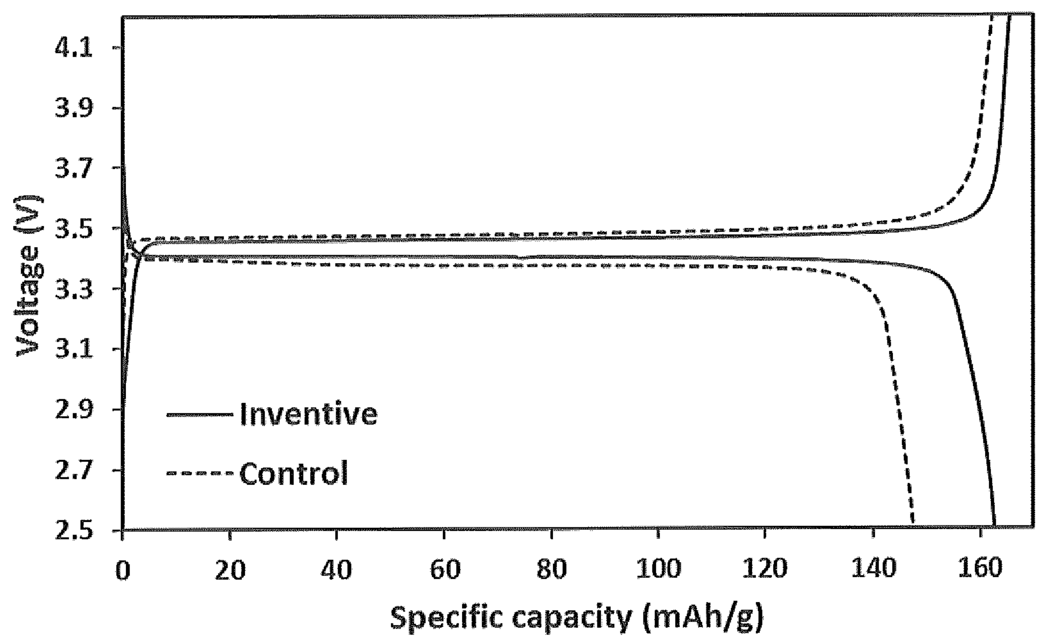
FIG. 3 is a graphical illustration of the charge/discharge profile of inventive $LiFePO_4/C$ vs. a Li half-cell at 0.1 C and 1 C rates.

FIG. 3 shows the charge/discharge profile of $LiFePO_4$/C vs. a Li half-cell at 0.1 C rate vs. a commercial LFP material. The voltage plateau at approximately 3.4 V is attributed to the $Fe^{2+}/Fe^{3+}$ redox couple and intercalation/de-intercalation of $Li^+$ during the charge/discharge process. A specific discharge capacity of 162 mAh/g at 0.1 C rate is achievable. FIG. 3 also shows a small difference between charge and discharge voltage plateau profile indicating low polarization and good reversibility.

Figure 4:
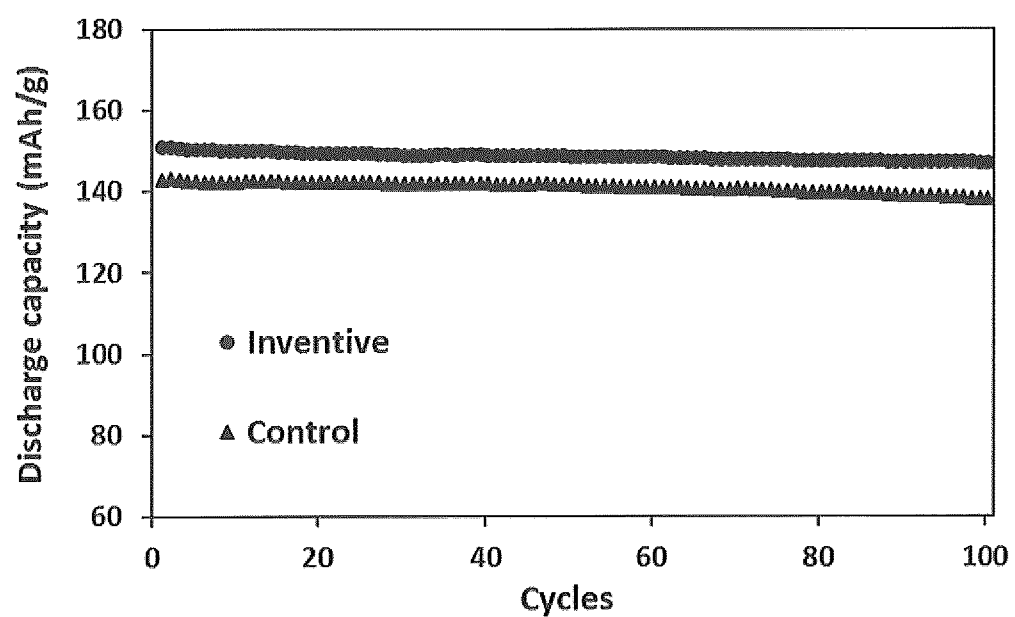
FIG. 4 is a graphical representation of the cycling of inventive $LiFePO_4/C$ vs. a Li half-cell at 1 C rate.
Figure 5:
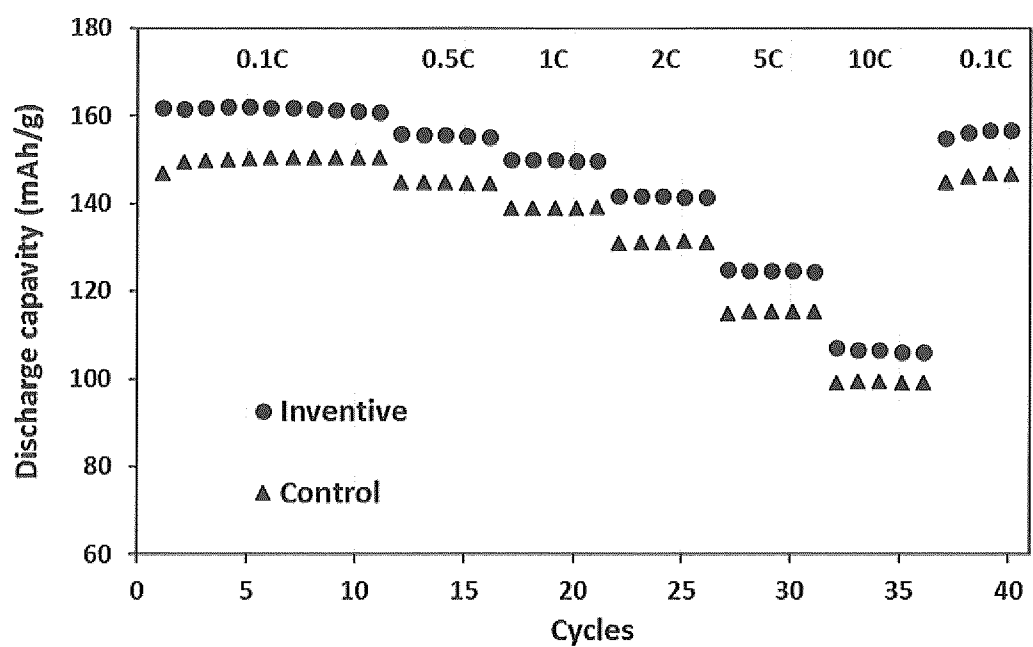
FIG. 5 is a graphical representation of the rate capability of inventive LiFePO4/C vs. a commercial half cell at different current rates.

FIG. 4 shows the cycling performance of $LiFePO_4$/C cathode materials at 1 C rate versus the commercially available material. The cycling performance at 1 C is very stable with almost no capacity fade. FIG. 5 shows the improved rate capability of the inventive material relative to the commercially available material wherein the inventive material is shown to achieve approximately 150 mAh/g at 1 C, and 110 mAh/g at 10 C rates.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A process for forming a lithium metal phosphate cathode material comprising:

forming an first aqueous solution comprising a first molar concentration of Li+;

adding a second molar concentration of $PO_4^{3-}$, a third molar concentration of $Fe^{3+}$ and an organic acid or a salt of an organic acid to water to form a second aqueous solution;

combining said first aqueous solution and said second aqueous solution and allowing a precipitate to form at ambient pressure where said precipitate comprises a reaction product of said $Fe^{3+}$ and said organic acid or said salt of an organic acid;

drying said precipitate to form said a precursor comprising said reaction product and a lithium salt; and calcining said precursor thereby forming said lithium metal phosphate cathode material having a formula represented by $LiMPO_4/C$ wherein said lithium metal phosphate cathode material comprises up to 3 wt % carbon.

2. The process for forming a lithium metal phosphate cathode material of claim 1 wherein said first molar concentration and said second molar concentration are in a ratio of 0.95:1 to 1.05:1.

3. The process for forming a lithium metal phosphate cathode material of claim 1 wherein said first molar concentration and said third molar concentration are in a ratio of 0.95:1 to 1.05:1.

4. The process for forming a lithium metal phosphate cathode material of claim 1 wherein said forming of said first aqueous solution comprises the addition of a lithium material comprising lithium and carbonate.

5. The process for forming a lithium metal phosphate cathode material of claim 4 wherein said lithium material is selected from the group consisting of $LiHCO_3$ and $Li_2CO_3$.

6. The process for forming a lithium metal phosphate cathode material of claim 5 wherein said $LiHCO_3$ is an in-situ reaction product of $Li_2CO_3$ and $CO_2$.

7. The process for forming a lithium metal phosphate cathode material of claim 1 wherein said forming of said first aqueous solution comprises the addition of a phosphate material comprising at least one counterion selected from the group consisting of $NH_4^+$ and $H^+$.

8. The process for forming a lithium metal phosphate cathode material of claim 7 wherein said phosphate material is selected from the group consisting of $H_3PO_4$, $NH_4H_2PO_4$, $(NH_4)_2HPO_4$ and $(NH_4)_3PO_4$.

9. The process for forming a lithium metal phosphate cathode material of claim 8 wherein said phosphate material is $H_3PO_4$ or $(NH_4)_2HPO_4$.

10. The process for forming a lithium metal phosphate cathode material of claim 1 wherein said organic acid comprises at least one carboxylic group.

11. The process for forming a lithium metal phosphate cathode material of claim 1 wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, and propane-1,2,3-tricarboxylic acid.

12. The process for forming a lithium metal phosphate cathode material of claim 11 wherein said organic acid is selected from the group consisting of oxalic acid, and citric acid.

13. The process for forming a lithium metal phosphate cathode material of claim 12 wherein said reaction product is iron oxalate.

14. The process for forming a lithium metal phosphate cathode material of claim 1 wherein said metal further comprises at least one element selected from the group consisting of $Ni^{2+}$, $Mn^{2+}$ and $Co^{2+}$.

15. The process for forming a lithium metal phosphate cathode material of claim 14 wherein said forming of said second aqueous solution comprises the addition of a metal salt wherein said metal salt is said salt of an organic acid.

16. The process for forming a lithium metal phosphate cathode material of claim 1 wherein said $LiMPO_4/C$ has the formula:

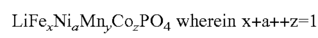

wherein:

$0 \le x \le 1$;

$0 \le y \le 1$;

$0 \le z \le 1$; and $0 \le a \le 0.1$.

17. The process for forming a lithium metal phosphate cathode material of claim 16 wherein said $0.5 \le x \le 1$.

18. The process for forming a lithium metal phosphate cathode material of claim 17 wherein said $0.9 \le x \le 1$.

19. The process for forming a lithium metal phosphate cathode material of claim 16 wherein said $0 \le y \le 0.5$.

20. The process for forming a lithium metal phosphate cathode material of claim 16 wherein said $0 \le z \le 0.5$.

21. The process for forming a lithium metal phosphate cathode material of claim 1 wherein said carbon is a coating.

22. The process for forming a lithium metal phosphate cathode material of claim 1 comprising at least 1 wt % carbon.

23. The process for forming a lithium metal phosphate cathode material of claim 1 comprising at least 1.5 wt % to 2.5 wt % carbon.

24. The process for forming a lithium metal phosphate cathode material of claim 1 wherein said allowing said precipitate to form comprises reacting for 5-24 hours.

25. The process for forming a lithium metal phosphate cathode material of claim 1 wherein said drying is selected from thin film drying and evaporative drying.

26. The process for forming a lithium metal phosphate cathode material of claim 1 wherein said calcining is at a temperature of 620° C. to 740° C.

27. The process for forming a lithium metal phosphate cathode material of claim 1 wherein said metal further comprises at least one element selected from the group consisting of nickel, manganese and cobalt.

28. A process for forming a lithium metal phosphate cathode precursor material comprising:

forming an first aqueous solution comprising a first molar concentration of $Li^+$;

adding a second molar concentration of $PO_4^3$, organic acid or a salt of an organic acid and a metal comprising $Fe^{3+}$ wherein said metal is present in a third molar concentration to water to form a second aqueous solution;

combining said first aqueous solution and said second aqueous solution and allowing a precipitate to form at ambient pressure where said precipitate comprises a reaction product of said $Fe^{3+}$and said organic acid and said salt of an organic acid; and drying said precipitate to form a precursor comprising said reaction product and a lithium salt.

29. The process for forming a lithium metal phosphate cathode precursor material of claim 28 wherein said first molar concentration and said second molar concentration are in a ratio of 0.95:1 to 1.05:1.

30. The process for forming a lithium metal phosphate cathode precursor material of claim 28 wherein said first molar concentration and said third molar concentration are in a ratio of 0.95:1 to 1.05:1.

31. The process for forming a lithium metal phosphate cathode precursor material of claim 28 wherein said forming of said first aqueous solution comprises the addition of a lithium material comprising lithium and carbonate.

32. The process for forming a lithium metal phosphate cathode precursor material of claim 31 wherein said lithium material is selected from the group consisting of $LiHCO_3$ and $Li_2CO_3$.

33. The process for forming a lithium metal phosphate cathode precursor material of claim 32 wherein said $LiHCO_3$ is an in-situ reaction product of $Li_2CO_3$ and $CO_2$.

34. The process for forming a lithium metal phosphate cathode precursor material of claim 28 wherein said forming of said first aqueous solution comprises the addition of a phosphate material comprising at least one counterion selected from the group consisting of $NH_4^+$ and $H^+$.

35. The process for forming a lithium metal phosphate cathode precursor material of claim 34 wherein said phosphate material is selected from the group consisting of $H_3PO_4$, $NH_4H_2PO_4$, $(NH_4)_2HPO_4$ and $(NH_4)_3PO_4$.

36. The process for forming a lithium metal phosphate cathode precursor material of claim 35 wherein said phosphate material is $H_3PO_4$ or $(NH_4)_2HPO_4$.

37. The process for forming a lithium metal phosphate cathode precursor material of claim 28 wherein said organic acid comprises at least one carboxylic group.

38. The process for forming a lithium metal phosphate cathode precursor material of claim 28 wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, and propane-1,2,3-tricarboxylic acid.

39. The process for forming a lithium metal phosphate cathode precursor material of claim 38 wherein said organic acid is selected from the group consisting of oxalic acid, and citric acid.

40. The process for forming a lithium metal phosphate cathode precursor material of claim 39 wherein said reaction product is iron oxalate.

41. The process for forming a lithium metal phosphate cathode precursor material of claim 28 wherein metal further comprises at least one element selected from the group consisting of $Ni^{2+}$, $Mn^{2+}$ and $Co^{2+}$.

42. The process for forming a lithium metal phosphate cathode precursor material of claim 41 wherein said forming of said second aqueous solution comprises the addition of a metal salt wherein said metal salt is said salt of an organic acid.

43. The process for forming a lithium metal phosphate cathode precursor material of claim 28 wherein said allowing said precipitate to form comprises reacting for 5-24 hours.

44. The process for forming a lithium metal phosphate cathode precursor material of claim 28 wherein said drying is selected from thin film drying and evaporative drying.

45. The process for forming a lithium metal phosphate cathode precursor material of claim 28 wherein said calcining is at a temperature of 620° C. to 740° C.

46. The process for forming a lithium metal phosphate cathode precursor material of claim 28 wherein metal selected from the group consisting of nickel, manganese and cobalt cobalt.

47. A process for forming battery comprising:

forming a lithium metal phosphate cathode material comprising:

forming an first aqueous solution comprising a first molar concentration of Li+;

adding a second molar concentration of $PO_4^{3-}$, organic acid or a salt of an organic acid and a metal wherein said metal comprises $Fe^{3+}$wherein said metal is present in a third molar concentration to water to form a second aqueous solution;

combining said first aqueous solution and said second aqueous solution and allowing a precipitate to form at ambient pressure where said precipitate comprises a reaction product of said $Fe^{3+}$and said organic acid or said salt of an organic acid;

drying said precipitate to form a precursor comprising said reaction product and a lithium salt; and calcining said precursor thereby forming said lithium metal phosphate cathode material having a formula represented by $LiMPO_4/C$ wherein said lithium metal phosphate cathode material comprises up to 3 wt % carbon; and combining said lithium metal phosphate cathode material with an anode, separator and dielectric in a battery.

48. The process for forming battery of claim 47 wherein said first molar concentration and said second molar concentration are in a ratio of 0.95:1 to 1.05:1.

49. The process for forming battery of claim 47 wherein said first molar concentration and said third molar concentration are in a ratio of 0.95:1 to 1.05:1.

50. The process for forming battery of claim 47 wherein said forming of said first aqueous solution comprises the addition of a lithium material comprising lithium and carbonate.

51. The process for forming battery of claim 50 wherein said lithium material is selected from the group consisting of $LiHCO_3$ and $Li_2CO_3$.

52. The process for forming battery of claim 51 wherein said $LiHCO_3$ an in-situ reaction product of $Li_2CO_3$ and $CO_2$.

53. The process for forming battery of claim 47 wherein said forming of said first aqueous solution comprises the addition of a phosphate material comprising at least one counterion selected from the group consisting of $NH_{4+}$and H+.

54. The process for forming battery of claim 53 wherein said phosphate material is selected from the group consisting of $H_3PO_4$, $NH_4H_2PO_4$, $(NH_4)_2HPO_4$ and $(NH_4)_3PO_4$.

55. The process for forming battery of claim 54 wherein said phosphate material is $H_3PO_4$ or $(NH_4)_2HPO_4$.

56. The process for forming battery of claim 47 wherein said organic acid comprises at least one carboxylic group.

57. The process for forming battery of claim 47 wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, and propane-1,2,3-tricarboxylic acid.

58. The process for forming battery of claim 57 wherein said organic acid is selected from the group consisting of oxalic acid, and citric acid.

59. The process for forming battery of claim 58 wherein said reaction product is iron oxalate.

60. The process for forming battery of claim 47 wherein said metal further comprises at least one element selected from the group consisting of $Ni^{2+}$, $Mn_{2+}$, and $Co_{2+}$.

61. The process for forming battery of claim 60 wherein said forming of said second aqueous solution comprises the addition of a metal salt wherein said metal salt is said salt of an organic acid.

62. The process for forming battery of claim 47 wherein said $LiMPO_4/C$ has the formula:

$$LiFe_xNi_aMn_yCo_zPO_4 \text{ wherein } x+a+y+z=1$$

wherein:

$0 \le x \le 1$;

$0 \le y \le 1$;

$0 \le z \le 1$; and $0 \le a \le 0.1$.

63. The process for forming battery of claim 62 wherein said $0.5 \le x \le 1$.

64. The process for forming battery of claim 63 wherein said $0.9 \le x \le 1$.

65. The process for forming battery of claim 62 wherein said $0 \le y \le 0.5$.

66. The process for forming battery of claim 62 wherein said $0 \le z \le 0.5$.

67. The process for forming battery of claim 47 wherein said carbon is a coating.

68. The process for forming battery of claim 47 comprising at least 1 wt % carbon.

69. The process for forming battery of claim 47 comprising at least 1.5 wt % to 2.5 wt % carbon.

70. The process for forming battery of claim 47 wherein said allowing said precipitate to form comprises reacting for 5-24 hours.

71. The process for forming battery of claim 47 wherein said drying is selected from spray drying and evaporative drying.

72. The process for forming battery of claim 47 wherein said calcining is at a temperature of 620° C. to 740° C.

73. The process for forming battery of claim 47 wherein metal is selected from the group consisting of nickel, manganese and cobalt.

74. A process for forming a lithium metal phosphate cathode material comprising:

forming an first aqueous solution comprising a first molar concentration of Li+;

forming a second aqueous solution comprising a second molar concentration of $PO_4^{3-}$, a third molar concentration of $Fe^{3+}$and an organic acid or a salt of an organic acid;

combining said first aqueous solution and said second aqueous solution and allowing a precipitate to form at ambient pressure where said precipitate comprises a reaction product of said $Fe^{3+}$and said organic acid or said salt of an organic acid;

drying said precipitate to form said a precursor comprising said reaction product and a lithium salt; and calcining said precursor thereby forming said lithium metal phosphate cathode material having a formula represented by $LiMPO_4/C$ wherein said lithium metal phosphate cathode material comprises up to 3 wt % carbon wherein said forming of said second aqueous solution comprises the addition of $Fe_2O_3$.

75. A process for forming a lithium metal phosphate cathode precursor material comprising:

forming an first aqueous solution comprising a first molar concentration of Li+;

forming a second aqueous solution comprising a second molar concentration of $PO_4^{3-}$, organic acid or a salt of an organic acid and a metal comprising $Fe^{3+}$wherein said metal is present in a third molar concentration;

combining said first aqueous solution and said second aqueous solution and allowing a precipitate to form at ambient pressure where said precipitate comprises a reaction product of said $Fe^{3+}$and said organic acid or said salt of an organic acid; and drying said precipitate to form a precursor comprising said reaction product and a lithium salt wherein said forming of said second aqueous solution comprises the addition of $Fe_2O_3$.

76. A process for forming battery comprising:

forming a lithium metal phosphate cathode material comprising:

forming an first aqueous solution comprising a first molar concentration of Li+;

forming a second aqueous solution comprising a second molar concentration of $PO_4^{3-}$, organic acid or a salt of an organic acid and a metal wherein said metal comprises $Fe^{3+}$wherein said metal is present in a third molar concentration;

combining said first aqueous solution and said second aqueous solution and allowing a precipitate to form at ambient pressure where said precipitate comprises a reaction product of said $Fe^{3+}$and said organic acid or said salt of an organic acid;

drying said precipitate to form a precursor comprising said reaction product and a lithium salt; and calcining said precursor thereby forming said lithium metal phosphate cathode material having a formula represented by $LiMPO_4/C$ wherein said lithium metal phosphate cathode material comprises up to 3 wt % carbon; and combining said lithium metal phosphate cathode material with an anode, separator and dielectric in a battery wherein said forming of said second aqueous solution comprises the addition of $Fe_2O_3$.

* * * * *